(12) United States Patent
Tomoguchi et al.

(10) Patent No.: US 7,749,348 B2
(45) Date of Patent: Jul. 6, 2010

(54) METHOD FOR MANUFACTURING POLARIZING PLATE, POLARIZING PLATE, OPTICAL FILM AND IMAGE VIEWING DISPLAY

(75) Inventors: Naoki Tomoguchi, Ibaraki (JP); Youichirou Sugino, Ibaraki (JP); Tadayuki Kameyama, Ibaraki (JP); Akira Ootani, Ibaraki (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 233 days.

(21) Appl. No.: 10/573,706

(22) PCT Filed: Aug. 3, 2004

(86) PCT No.: PCT/JP2004/011089

§ 371 (c)(1),
(2), (4) Date: Mar. 27, 2006

(87) PCT Pub. No.: WO2005/033754

PCT Pub. Date: Apr. 14, 2005

(65) Prior Publication Data
US 2006/0291054 A1 Dec. 28, 2006

(30) Foreign Application Priority Data
Sep. 30, 2003 (JP) ............................. 2003-339286

(51) Int. Cl.
*B32B 17/00* (2006.01)
*B32B 17/10* (2006.01)
*C03C 27/00* (2006.01)
*G02C 7/00* (2006.01)
*G02B 5/30* (2006.01)
*G02B 27/28* (2006.01)

(52) U.S. Cl. ........................ 156/99; 359/485

(58) Field of Classification Search ................ 156/99; 359/485
See application file for complete search history.

(56) References Cited

U.S. PATENT DOCUMENTS 2,263,249 A * 11/1941 Rogers ....................... 359/490

(Continued)

FOREIGN PATENT DOCUMENTS

JP 7-198945 8/1995

(Continued)

OTHER PUBLICATIONS

International Search Report of PCT/JP2004/011089, dated Nov. 2, 2004.

(Continued)

*Primary Examiner*—Philip C Tucker
*Assistant Examiner*—Michael N Orlando
(74) *Attorney, Agent, or Firm*—Westerman, Hattori, Daniels & Adrian, LLP

(57) ABSTRACT

A method for manufacturing a polarizing plate in which a transparent protective film is provided on at least one surface of a polarizer with an adhesive layer interposed therebetween, wherein an adhesive is coated on a surface of the transparent protective film on which the adhesive layer is formed or/and a surface of the polarizer on which the adhesive layer is formed to form the adhesive layers, and thereafter, an aqueous liquid is caused to be present on an adhering surface when the transparent protective film and the polarizer are continuously adhered to each other with the adhesive layer interposed therebetween. A polarizing plate having uniform polarization characteristics, and excellent in durability is obtained by the method.

23 Claims, 2 Drawing Sheets

U.S. PATENT DOCUMENTS

| | | | | |
|---|---|---|---|---|
| 4,737,410 | A | * | 4/1988 | Kantner ....................... 428/343 |
| 5,945,209 | A | * | 8/1999 | Okazaki et al. .......... 428/304.4 |
| 2003/0072078 | A1 | * | 4/2003 | Higashio et al. ............ 359/485 |
| 2003/0137732 | A1 | * | 7/2003 | Sugino et al. ............... 359/491 |

FOREIGN PATENT DOCUMENTS

| | | |
|---|---|---|
| JP | 7-306315 | 11/1995 |
| JP | 7-306316 | 11/1995 |
| JP | 11-179871 | 7/1999 |
| JP | 2001-296426 | 10/2001 |
| JP | 2002-365432 | 12/2002 |

OTHER PUBLICATIONS

Notification of Transmittal of Translation of the International Preliminary Report on Patentability (Form PCT/IB/338) of International Application No. PCT/JP2004/011089 mailed Jun. 22, 2006 with Form PCT/IPEA/409.

* cited by examiner

METHOD FOR MANUFACTURING POLARIZING PLATE, POLARIZING PLATE, OPTICAL FILM AND IMAGE VIEWING DISPLAY

TECHNICAL FIELD

The invention relates to a method for manufacturing a polarizing plate. The invention further relates to a polarizing plate obtained by the manufacturing method. The polarizing plate, alone as it is or as an optical film manufactured by laminating the polarizing plates, can form a liquid crystal display (hereinafter referred to as LCD for short), a flat panel display such as an electroluminescence display (hereinafter referred to as ELD for short) or an image viewing display such as PDP.

BACKGROUND ART

A polarizing plate for a flat panel display, especially a polarizing plate used in LCD, generally employs a polyvinyl alcohol (PVA)-based film with a thickness of 70 μm or more mainly as a raw material. In order to obtain sufficient optical characteristics as LCD, preferably used is a polarizing plate manufactured by stretching a PVA-based film containing a dichroic material such as iodine and adhering a transparent protective film onto the stretched PVA based film. The polyvinyl alcohol-based polarizer is stretched in its manufacture; therefore the polarizer is easy to shrink. Since a PVA-based film is made of a hydrophilic polymer, the film is very easily deformed especially in a humidified condition. Moreover, since a mechanical strength of the film itself is low, the film has a problem of tearing. Hence, transparent protective films such as a film made of saponified triacetyl cellulose are adhered onto both sides or one side of a polarizer to thereby supplement its mechanical strength for its actual use. The polarizing plate is manufactured by adhering a transparent protective film to a polarizer with an adhesive. An aqueous adhesive is preferably used as an adhesive for a polarizing plate used in adhering a transparent protective film to a polarizer: an example thereof is a polyvinyl alcohol-based adhesive obtained by mixing a crosslinking agent into a polyvinyl alcohol aqueous solution.

Improvement on uniformity and quality of a screen image has been demanded in company with progress in high definition and high functionality of LCD. A heat resistance, a wet heat resistance and a water resistance at high levels have been requested because of a trend to more of diversification in usage environment. A low profile and weight reduction of LCD have also been required because of a trend to a function of portability in recent years. Requirements directed to a polarizing plate for LCD, from such required characteristics of LCD, include: higher performance and higher functionality as a polarizer at various angles such as uniformity, high heat resistance, high wet heat resistance, water resistance, low profile and the like.

A method for manufacturing a polarizing plate by adhering a transparent protective film onto a polarizer is exemplified as follows: First of all, as one method, an adhesive solution is coated on one surface of the polarizer and thereafter, a transparent protective film is adhered to the one surface. Then, the adhesive solution is coated onto the other surface of the polarizer and thereafter, a transparent protective film is adhered to the other surface thereof. Thereby, the transparent protective films are adhered to both surfaces of the polarizer with the adhesive layers interposed therebetween to thereby manufacture a polarizing plate. Note that the adhesive solution is coated directly on the transparent protective film or the adhesive solution is coated on both of the polarizer and the transparent protective film. Another method has been proposed in which, transparent protective films are disposed on both surfaces of a polarizer and the transparent protective films and the polarizer are caused to continuously pass through between rolls in a pair while an adhesive solution is supplied to therebetween (see JP-A No. 11-179871), or alternatively, transparent protective films and a polarizer are caused to continuously pass through between rolls in a pair in a state where adhesive layers are formed by coating an adhesive on surfaces of the transparent protective films on each of which adhesive layers are formed or/and an adhesive layer is formed by coating an adhesive on a surface of a polarizer on which the adhesive layer is formed, and the transparent protective films are adhered to the polarizer by a pressure of the rolls, thereby manufacturing a polarizing plate.

In the conventional process, however, a problem has been arisen that stripe-shaped appearance faults are generated during adhesion of the transparent protective films and the polarizer. Such a stripe-shaped appearance faults exerts an adverse influence on required high characteristics of a polarizing plate, especially on an optical uniformity among them. Therefore, there has been a reality that a progress in the related technology cannot cope with improvement on uniformity and quality of a screen image required in company with progress toward higher definition and higher functionality of LCD. The term "stripe-shaped appearance faults" means a view of in the absorption axis direction of a polarizing plate obtained by adhering a transparent protective film thereto, when being visually observed, as a reflection image of stripes parallel to one another. A feature of the stripes is to be recognized as track grooves cut on a phonograph record with a pitch in the range of 1 to 2 mm.

A polarizer is used as a polarizing plate reinforced by a transparent protective film in strength. A case has been conventionally arisen, however, where a polyvinyl alcohol-based adhesive causes separation at the interface between the polarizer and the transparent protective film in a humidified condition. A possibility can be assumed as a cause thereof that a polyvinyl alcohol-based resin, which is a main component of the adhesive, is a water-soluble polymer, suffers dissolution thereof into water of dew condensates.

In order to solve such a problem, a resin solution including a polyvinyl alcohol-based resin having an acetoacetyl group therein and a crosslinking agent is employed as a PVA-based adhesive to thereby improve wet heat resistance and water resistance (see JP-A No. 7-198945). However, a wafer resistance of an adhesive for a polarizing plate, which is described in an embodiment in JP-A No. 7-198945., has been insufficient. Moreover, the adhesive has been insufficient because of stripe-shaped appearance faults.

A method has been proposed in which an adhesive layer is provided on a polarizer or a transparent protective film and a contact angle of the adhesive layer is previously controlled at a predetermined angle or less by humidification and thereafter, the polarizer and the transparent protective film is adhered to each other to thereby manufacture a polarizing plate (see JP-A Nos. 7-306315 and 7-306316). In the methods of JP-A Nos. 7-306315 and 7-306316, a control is difficult and a fabrication process is complicated; therefore, the methods cannot be said to be practical manufacturing methods.

DISCLOSURE OF INVENTION

The invention has been made in light of such circumstances and it is an object of the invention to provide a method for efficiently manufacturing a polarizing plate having uniform polarization characteristics, and excellent in durability.

It is a further object of the invention to provide a polarizing plate obtained by the manufacturing method. It is a still further object of the invention to provide an optical film obtained by laminating the polarizing plates and an image viewing display such as LCD and ELD using the polarizing plate and the optical film.

The inventors have conducted serious studies in order to solve the above tasks with findings that the objects can be achieved with an adhesive for polarizing plate shown below, having led to completion of the invention.

1. A method for manufacturing a polarizing plate in which a transparent protective film is provided on at least one surface of a polarizer with an adhesive layer interposed therebetween, wherein an adhesive is coated on a surface of the transparent protective film on which the adhesive layer is formed or/and a surface of the polarizer on which the adhesive layer is formed to form the adhesive layers, and thereafter, an aqueous liquid is caused to be present on an adhering surface when the transparent protective film and the polarizer are continuously adhered to each other with the adhesive layer interposed therebetween.

2. The method for manufacturing the polarizing plate above-mentioned 1, wherein the polarizer is a polyvinyl alcohol-based polarizer and the transparent protective film is a cellulose-based transparent protective film.

3. The method for manufacturing the polarizing plate above-mentioned 1 or 2, wherein a thickness of the polarizer is 35 μm or less.

4. The method for manufacturing the polarizing plate above-mentioned any one of 1 to 3, wherein the adhesive is a polyvinyl alcohol-based adhesive.

5. The method for manufacturing the polarizing plate above-mentioned 4, wherein the polyvinyl alcohol-based adhesive is a polyvinyl alcohol-based adhesive having an acetoacetyl group.

6. The method for manufacturing the polarizing plate above-mentioned any one of 1 to 5, wherein the adhesive comprises a crosslinking agent.

7. The method for manufacturing the polarizing plate above-mentioned 6, wherein the crosslinking agent is a methylol compound.

8. The method for manufacturing the polarizing plate above-mentioned any one of 1 to 7, wherein a thickness of the adhesive layer is in the range of 30 to 300 nm.

9. The method for manufacturing the polarizing plate above-mentioned any one of 1 to 8, wherein a viscosity of the aqueous liquid is in the range of 0.1 to 10 cP.

10. The method for manufacturing the polarizing plate above-mentioned any one of 6 to 9, wherein the aqueous liquid is water.

11. The method for manufacturing the polarizing plate above-mentioned any one of 1 to 9, wherein the aqueous liquid is an aqueous solution comprising a crosslinking agent dissolved therein.

12. The method for manufacturing the polarizing plate above-mentioned 11, wherein the crosslinking agent is a methylol compound.

13. The method for manufacturing the polarizing plate above-mentioned any one of 1 to 12, wherein the aqueous liquid is supplied on an adhering surface between the transparent protective film and the polarizer.

14. The method for manufacturing the polarizing plate above-mentioned any one of 1 to 12, wherein the adhesive is coated only onto the transparent protective film side and the aqueous liquid is supplied on the adhesive layer formed by the coating to thereby cause the aqueous liquid to be present on the adhering surface.

15. The method for manufacturing the polarizing plate above-mentioned any one of 1 to 12, wherein the adhesive is coated only onto the transparent protective film side, while the aqueous liquid is supplied onto the polarizer side to thereby cause the aqueous liquid to be present on the adhering surface.

16. The method for manufacturing the polarizing plate above-mentioned any one of 1 to 12, wherein the adhesive is coated only onto the polarizer side, while the aqueous liquid is supplied onto the transparent protective film side to thereby cause the aqueous liquid to be present on the adhering surface.

17. The method for manufacturing the polarizing plate above-mentioned any one of 1 to 16, wherein the aqueous liquid is supplied onto an adhering surface just before adhesion when the transparent protective film and the polarizer are continuously adhered to each other with the adhesive layer interposed therebetween.

18. A polarizing plate obtained by the method above-mentioned any one of 1 to 17.

19. An optical film comprising at least one polarizing plate above-mentioned 18.

20. An image viewing display comprising the polarizing plate above-mentioned 18 or the optical film above-mentioned 19.

In the methods for manufacturing the polarizing plate of the invention, an adhesive is coated on a surface of at least one of a transparent protective film and a polarizer to thereby manufacture the transparent protective film or the polarizer on which an adhesive layer has been formed thereon before the polarizer and the transparent protective film are adhered to each other with an adhesive agent. Then, in adhesion of the transparent protective film to the polarizer, an aqueous liquid is caused to be present on an adhering surface, that is, the adhesive layer, of the transparent protective film and the polarizer. Hence, a polarizing plate is obtained that has suppressed generation of appearance faults, especially stripe-shaped irregularity. Such a polarizing plate is suppressed with respect to stripe-shaped appearance faults, which make it possible to provide an image viewing display such as a high performance LCD and a high performance ELD with uniform polarization characteristics. The manufacturing method of the invention is suited for a continuous manufacture to thereby enable a polarizing plate to be manufactured with good efficiency. Addition of an aqueous liquid to an adhesive layer enables a polarizing plate to be excellent in durability. Especially in a case where an adhesive is a polyvinyl alcohol-based adhesive having an acetoacetyl group and contains a methylol melamine as a crosslinking agent, durability of the adhesive is improved.

A detailed mechanism is not clear of the fact that a manufacturing method of the invention is effective for suppression of stripe-shaped appearance faults occurring in a polarizing plate. The reason for generating stripe-shaped appearance faults in a conventional manufacturing method as described above is guessed that an adhesive solution with a high viscosity is brought into contact with a surface of a polarizer or a transparent protective film in the course of adhesion of the transparent protective film to the polarizer, which, as a physical factor, exerts a physical force on the polarizer, while in the invention, the physical factor seems to be eliminated due to the presence of an aqueous liquid.

It has also found, as a surprise, that in a manufacturing method of the invention, an adhesive with a higher reactivity is more effective in suppression of generation of such stripe-shaped appearance faults than an adhesive with a lower reactivity. A mechanism thereof is not necessarily cleared. Since an adhesive with a low reactivity is generally higher in dissolubility in water, an adhesive layer once formed on a surface of a transparent protective film or a polarizer is redissolved into an added aqueous liquid. The reason for suppressing generation of such stripe-shaped faults is imagined that a viscosity of the added aqueous solution is increased by the redissolution in the vicinity of a surface of the polarizer or the transparent protective film as a counterpart to be adhered. Therefore, a manufacturing method of the invention is especially effective for an adhesive with a high reactivity.

BEST MODE FOR CARRYING OUT THE INVENTION

Figure 1:
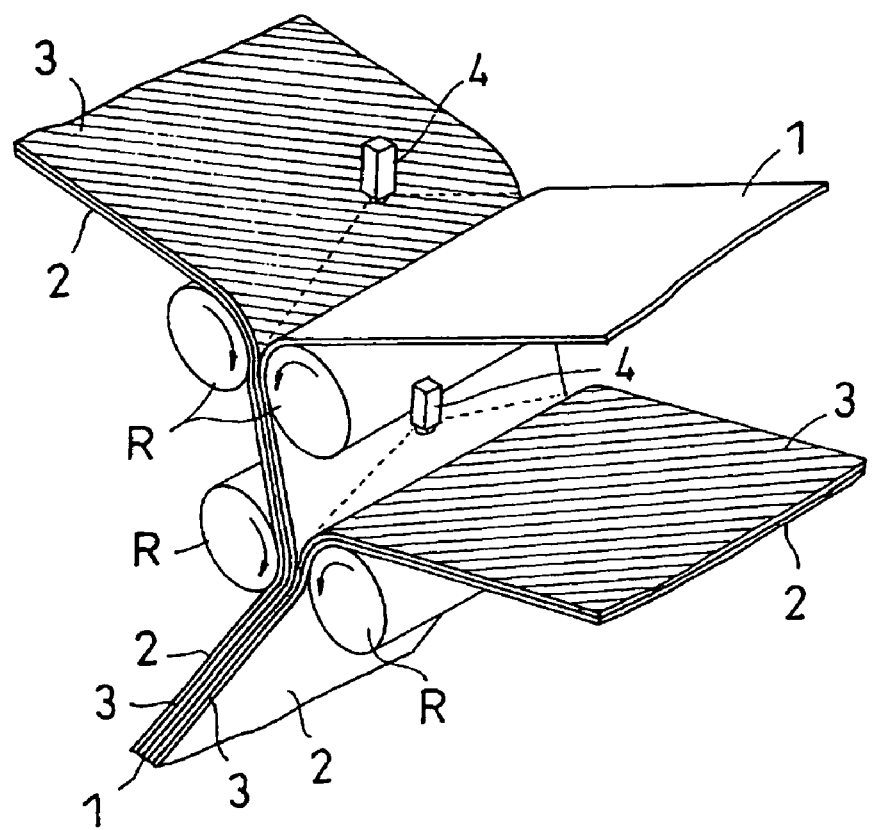
FIG. 1 is an example of a schematic view of a method for manufacturing a polarizing plate of the invention.

Various kinds of polarizers can be used without imposing a specific limitation on thereon. Examples of the polarizers include: hydrophilic polymer films, such as a polyvinyl alcohol-based film, a partially formalized polyvinyl alcohol-based film and an ethylene vinyl acetate copolymer-based partially saponified film, obtained by adsorbing a dichroic material such as iodine or a dichroic dye on the films and then uniaxially stretching them; orientation films of polyenes such as a dehydrated polyvinyl alcohol and dehydrochlorinated polyvinyl chloride. Among them, preferable is a polarizer comprising a polyvinyl alcohol-based film and a dichroic material such as iodine or a dichroic dye.

A polyvinyl alcohol-based film that can be properly used is formed as a film by means of any one of methods such as a flow casting method, in which an undiluted liquid prepared by dissolving a polyvinyl alcohol-based resin into water or an organic solvent is caused to flow-cast on a surface to form a film, a casting method or an extrusion method. A polymerization degree of a polyvinyl alcohol-based resin is preferably in the range of about 100 to 5000 and more preferably in the range of 1400 to 4000.

A polarizer obtained by dyeing a polyvinyl alcohol-based film with iodine or the like and stretching the dyed film uniaxially is manufactured, for example, according to the following method.

In a dyeing step, a polyvinyl alcohol-based film is immersed in a dye bath into which iodine is added at a temperature in the range of about 20 to 70° C. for a time ranging 1 to 20 min to thereby cause iodine to be adsorbed thereon. An iodine concentration of the dye bath is usually in the range of about 0.1 to 1 part by weight relative to 100 parts by weight of water. An assistant such as iodides may be added into the dye bath in the range of about 0.02 to 20 parts by weight and preferably in the range of 2 to 10 parts by weight, examples of the iodides including: potassium iodide, lithium iodide, sodium iodide, zinc iodide, aluminum iodide, lead iodide, copper iodide, barium iodide, calcium iodide, tin iodide, titanium iodide and the like. An iodide described above is especially preferable in order to increase a dyeing efficiency. A small amount of an organic solvent compatible with water may be incorporated therein in addition to water solvent.

A polyvinyl alcohol-based film may also be subjected to a swelling treatment in a water bath or the like at a temperature in the range of about 20 to 60° C. for a time in the range of about 0.1 to 10 min before dyeing in an aqueous solution containing iodine or a dichroic dye. In the swelling treatment in the water bath, not only is the polyvinyl alcohol-based film water washed to thereby enable contamination and a blocking preventive agent on a surface of the polyvinyl alcohol-based film to be cleaned but an effect of swelling the polyvinyl alcohol-based film is also exerted to thereby prevent ununiformity such as dyeing irregularity.

The dyeing treated polyvinyl alcohol-based film can be crosslinked when required. A composition of a crosslinking aqueous solution for crosslinkage is such that a crosslinking agent such as boric acid, borax, glyoxal or glutaraldehyde alone or in mixture is usually contained in the range of about 1 to 10 parts by weight relative to 100 parts by weight of water. A concentration of a crosslinking agent is determined in consideration of a balance between an optical characteristics and shrinkage of a polarizing plate caused by a stretching force generated in the polyvinyl alcohol-based film.

An assistant such as iodides may be added into a crosslinking bath in the range of 0.05 to 15 wt % and preferably in the range of 0.5 to 8 wt %; examples of the iodides including: potassium iodide, lithium iodide, sodium iodide, zinc iodide, aluminum iodide, lead iodide, copper iodide, barium iodide, calcium iodide, tin iodide, titanium iodide and the like. An additive described above is especially preferable because of in-plane uniform characteristics of a polarizer. A temperature of an aqueous solution is usually in the range of about 20 to 70° C. and preferably in the range of 40 to 60° C. An immersion time is not specifically limited, but usually in the range of about 1 sec to 15 min and preferably in the range of 5 sec to 10 min. A small amount of an organic solvent compatible with water may be contained in addition to an aqueous solvent.

A total stretch magnification of a polyvinyl alcohol-based film is in the range of about 3 to 7 times and preferably in the range of 5 to 7 as long as the original length. If a total stretch magnification exceeds 7 times, the film is easy to be broken. Stretching may be conducted either after dyeing, while dyeing or crosslinking, or stretching may be followed by dyeing with iodine. The stretch method, the number of times of stretches or the like is not specifically limited and a stretch may be conducted only in one step. Alternatively, plural times of stretches may be conducted in the same step.

A polyvinyl alcohol-based film having been subjected to an iodine-adsorption orientation treatment can be subjected to a step of further immersing the film in an potassium iodide of aqueous solution with a concentration of 0.1 to 10 mass % at a temperature in the range of about 10 to 60° C. and preferably in the range of about 30 to 40° C. for a time in the range of 1 sec to 1 min. An assistant such as zinc sulfate or zinc chloride may be added into an aqueous iodine solution. A polyvinyl alcohol-based film having been subjected to the iodine-adsorption orientation treatment may be treated with a water-washing step and a drying step at a temperature in the range of about 20 to 80° C. for a time in the range of about 1 min to 10 min.

No specific limitation is imposed on a thickness of a polarizer, but generally is in the range of about 5 to 80 μm. If a thickness thereof is thinner, water in a polarizer is easier to be evaporated in a drying step or the like in adhesion of a transparent protective film to the polarizer in a manufacturing process of the polarizing plate. Hence, an elongation of the polarizer decreases to thereby easily generate conspicuous stripe-shaped appearance faults. Such a phenomenon is more conspicuously observed as a thickness of the polarizer is smaller, but according to a manufacturing method for a polarizing plate of the invention, generation of stripe-shaped appearance faults can be suppressed in a case where a thickness of the polarizer is 35 μm or less and furthermore even in a case where a thickness of the polarizer is 20 μm or less.

Proper transparent materials may be used as a transparent polymer or a film material that forms the transparent protective file, and the material having outstanding transparency, mechanical strength, heat stability and outstanding moisture interception property, etc. may be preferably used. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a transparent protective film, polyolefin type polymers, such as polyethylene, polypropylene, polyolefin that has cyclo- type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The transparent protective film is formed as a cured layer made of heat curing type or ultraviolet ray curing type resins, such as acryl based, urethane based, acryl urethane based, epoxy based, and silicone based, etc.

Moreover, as is described in Japanese Patent Laid-Open Publication No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

A thickness of the transparent protective film can be properly determined and generally on the order in the range of from about 1 to about 500 μm from the viewpoint of a strength, workability such as handlability, requirement for a thin film and the like. Especially, the thickness is preferably in the range of from 1 to 300 μm and more preferably in the range of from 5 to 200 μm. The transparent protective film having a thickness of 50 μm or less is preferably used.

Moreover, it is preferable that the transparent protective film may have as little coloring as possible. Accordingly, a transparent protective film having a retardation value in a film thickness direction represented by $Rth=[(nx+ny)/2-nz] \times d$ of from −90 nm to +75 nm (where, nx and ny represent principal indices of refraction in a film plane, nz represents refractive index in a film thickness direction, and d represents a film thickness) may be preferably used. Thus, coloring (optical coloring) of polarizing plate resulting from a transparent protective film may mostly be cancelled using a transparent protective film having a retardation value (Rth) of from −90 nm to +75 nm in a thickness direction. The retardation value (Rth) in a thickness direction is preferably from −80 nm to +60 nm, and especially preferably from −70 nm to +45 nm.

As transparent protective films, preferable are a cellulose-based polymer such as triacetyl cellulose from the standpoint of a polarization characteristic, a durability or the like. Especially preferable is a triacetyl cellulose film. Note that in a case where transparent protective films are provided on both sides of a polarizer, the transparent protective films made from the same polymer may be used on both sides thereof or alternatively, the transparent protective films made from polymer materials different from each other may also be used on respective both sides thereof.

An easy adhesion treatment can be applied onto a surface of a transparent protective film which is adhered to a polarizer. Examples of easy adhesion treatments include: dry treatments such as a plasma treatment and a corona treatment; chemical treatment such as alkaline treatment; and a coating treatment in which an easy adhesion layer is formed. Among them, preferable are a coating treatment and an alkaline treatment each forming an easy adhesion layer. In formation of an easy adhesion layer, there can be used each of various kinds of easy adhesion materials such as a polyol resin, a polycarboxylic resin and a polyester resin. Note that a thickness of an easy adhesion layer is preferably usually from about 0.01 to about 10 μm, more preferably from about 0.05 to about 5 μm and especially preferably from about 0.1 to 1 μm.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the transparent protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the transparent protective film itself, and also they may be prepared as an optical layer different from the transparent protective film.

No specific limitation is placed on an adhesive used in adhesion of a transparent protective film to a polarizer, but a polyvinyl alcohol-based adhesive is preferably used. A polyvinyl alcohol-based adhesive usually contains a polyvinyl alcohol-based resin and a crosslinking agent. However, in a case where an aqueous solution containing a crosslinking agent is used as an aqueous liquid, a crosslinking agent may be contained or is unnecessary to be contained in an adhesive.

Exemplified as polyvinyl alcohol-based resins are a polyvinyl alcohol resin and a polyvinyl alcohol resin having an acetoacetyl group. A polyvinyl alcohol resin having an acetoacetyl group is a polyvinyl alcohol-based adhesive having a highly reactive functional group and preferably improves of durability of a polarizing plate.

Examples of polyvinyl alcohol-based resin include: a polyvinyl alcohol obtained by saponifying a polyvinyl acetate; a derivative thereof; a saponified copolymer of vinyl acetate and a monomer copolymerizable therewith; and polyvinyl alcohols modified by acetalization, urethanization, etherification, grafting, phosphate esterification and the like. Examples of the monomers include, unsaturated carboxylic acids such as maleic anhydride, fumaric acid, crotonic acid, itaconic acid and (meth) acrylic acid, and esters thereof; α-olefins such as ethylene and propylene; (meth)allylsulfonic acid or sodium salt thereof, (meth)allylsulfonate; sodium sulfonate (monoalkyl maleate), sodium disulfonate (alkyl maleate); N-methylolacrylamide; an alkai salt of acrylamide alkylsulfonate; N-vinylpyrrolidone, a derivative of N-vinylpyrrolidone and the like. The polyvinyl alcohol-based resins can be either used alone or in combination of two kinds or more.

While no specific limitation is imposed on a polyvinyl alcohol-based resin, an average degree of polymerization is from about 100 to about 3000, preferably from 500 to 3000 and an average degree of saponification is from about 85 to about 100 mol %, preferably from 90 to 100 mol % in consideration of adherence.

A polyvinyl alcohol-based resin having an acetoacetyl group is obtained by reacting a polyvinyl alcohol-based resin and diketene to each other with a known method. Examples of known methods include: a method in which a polyvinyl alcohol-based resin is dispersed into a solvent such as acetic acid, to which diketene is added and a method in which a polyvinyl alcohol-based resin is previously dissolved into a solvent such as dimethylformamide or dioxane, to which diketene is added. Another example is a method in which diketene gas or diketene liquid is brought into direct contact with a polyvinyl alcohol.

No specific limitation is imposed on a degree of modification by an acetoacetyl group in a polyvinyl alcohol-based resin having an acetoacetyl group or groups as far as the degree of modification is 0.1 mol % or more. If the degree of modification is less than 0.1 mol %, water resistance of an adhesive layer is insufficient, which is improper. A degree of modification by an acetoacetyl group is preferably from about 0.1 to about 40 mol %, more preferably from 1 to 20 mol %, further preferably from 2 to 7 mol %. If a degree of modification by an acetoacetyl group exceeds 40 mol %, reaction sites with a crosslinking agent is fewer to thereby reduce an effect of improvement on water resistance. A degree of modification by an acetoacetyl group is a value determined with NMR.

Any of crosslinking agents that have been used in a polyvinyl alcohol-based adhesive can be used as a crosslinking agent in the invention without a specific limitation thereon. A crosslinking agent that can be used is a compound having at least two functional groups having reactivity with a polyvinyl alcohol-based resin. Examples thereof include: alkylene diamines having an alkylene group and two amino groups such as ethylene diamine, triethylene diamine and hexamethylene diamine; isocyanates such as tolylene diisocyanate, hydrogenated tolylene diisocyanate, trimethylolpropane tolylene diisocyanate adduct, triphenylmethane triisocyanate, methylenebis(4-phenylmethane) triisocyanate and isophorone diisocyanate, and ketoxime-blocked products thereof or isocyanates of phenol-blocked products; epoxy compounds such as ethylene glycol diglycidyl ether, polyethylene glycol diglycidyl ether, glycerin di- or triglicydyl ether, 1,6-hexanediol diglycidyl ether, trimethylolpropane triglycidyl ether, diglicidyl aniline and diglycidyl amine; monoaldehydes such as formaldehyde, acetaldehyde, propionaldehyde and butylaldehyde; dialdehydes such as glyoxal, malonaldehyde, succindialdehyde, glutardialdehyde, maleic dialdehyde and phthaldialdehyde; amino-formaldehyde resins such as condensates with formaldehyde of methylolurea, methylolmelamine, alkylated methylolurea, alkylated methylolmelamine, acetoguanamine and benzoguanamine; salts of divalent metals or trivalent metals such as sodium, potassium, magnesium, calcium, aluminum, iron and nickel, and oxides of the metals.

A mixing quantity of a crosslinking agent described above is usually in the range of about 0.1 to 35 parts by weight and preferably in the range of 10 to 25 parts by weight relative to 100 parts by weight of a polyvinyl alcohol-based resin. In the range, a polarizing plate can be obtained with uniform polarization characteristics and excellency in durability.

On the other hand, in order to further improve durability, a crooslinking agent can be mixed in the range of more than 30 parts by weight and 46 parts by weight or less relative to 100 parts by weight of a polyvinyl alcohol-based resin into the resin. Especially, in a case where polyvinyl alcohol-based resin having an acetoacetyl group is employed, an amount of a crosslinking agent to be used is preferably more than 30 parts by weight. By mixing a crosslinking agent in the range of more than 30 parts by weight and 46 parts by weight or less, a water resistance can be drastically improved. A more mixing quantity of a croslinking agent is more preferable in the above-mentioned range and a mixing quantity thereof is preferably equal to or more than 31 parts by weight, more preferably equal to or more than 32 parts by weight and especially preferably equal to or more than 35 parts by weight. On the other hand, if a mixing quantity thereof is excessively more, a reaction of a crosslinking agent progresses in a short time to cause an adhesive to have a trend to gelation. As a result, a pot life as an adhesive is reduced to the extremity and the adhesive has difficulty using in the industrial aspect. From such a viewpoint, a mixing quantity of a crosslinking agent is preferably 46 parts by weight or less, more preferably 45 parts by weight or less and especially preferably 40 parts by weight or less.

An adhesive described above (including a case where a polyvinyl alcohol-based adhesive and a crosslinking agent are contained) is usually used as an aqueous solution. No specific limitation is placed on a concentration in an aqueous solution, but, in consideration of coatability and storage stability, a concentration thereof is usually in the range of 0.1 to 15 wt %, preferably in the range of 0.5 to 10 wt % and more preferably in the range of about 0.5 to 2 wt %. As a concentration in a solution is higher, a viscosity increases to thereby, easily generate stripe-shaped appearance irregularity. If a concentration therein is excessively lower, a viscosity is lowered to thereby render coatability worsened.

Note that various additives described below can be further mixed into an adhesive: coupling agents such as a silane coupling agent and a titanium coupling agent; various kinds of tackifiers; an ultraviolet absorbent; an antioxidant; stabilizers such as a heat resistance stabilizer and a hydrolysis resistance stabilizer; and the like.

Note that in a method for manufacturing a polarizing plate in the case where an adhesive containing a crosslinking agent in the range of more than 30 parts by weight and 46 parts by weight or less relative to 100 parts by weight of polyvinyl alcohol-based resin containing an acetoacetyl group is used, the adhesive is preferably prepared within 4 hr before coating the adhesive. There is a tendency of gelation in an adhesive obtained by mixing a crosslinking agent into polyvinyl alcohol-based resin containing an acetoacetyl group after being left as it is for a long time. Hence, an adhesive is preferably prepared in the shortest possible time before coating the adhesive. An adhesive is preferably prepared within 4 hr before coating the adhesive. An adhesive is more preferably prepared within 3 hr and especially preferably prepared within 30 min before coating the adhesive.

In a method for manufacturing a polarizing plate of the invention, an adhesive is coated on a surface of a transparent protective film on which an adhesive layer is formed or/and on a surface of a polarizer on which an adhesive layer is formed to thereby form an adhesive layer. A thickness of an adhesive layer affects water resistance and wet heat resistance, and with increase in thickness of an adhesive layer, durability is improved. With increase in a thickness of an adhesive layer, a solution with a higher viscosity is required in a manufacturing process therefor, therefore accompanying non-uniformity, especially generation of stripe-shaped appearance faults due to physical stress acting in a PVA-based polarizer. From such a viewpoint, a thickness of an adhesive layer is preferably in the range of 30 to 300 nm. A thickness of an adhesive layer is more preferably in the range of 60 to 250 nm. If a thickness thereof is less than 30 nm, a case arises where coating is difficult or an appearance fault is easily generated. On the other hand, if a thickness thereof exceeds 300 mm, appearance faults are easily generated and durability is unpreferably degraded.

An adhesive described above may be coated on either a transparent protective film or a polarizer, or both of them. An adhesive is preferably coated to a thickness in the range of about 30 to 300 nm after drying.

No specific limitation is placed on a coating operation and any of various kinds of means such as a roll method, a spray method, an immersion method and the like may be employed. After coating an adhesive, a drying step is applied to thereby form an adhesive layer, which is a dry coat layer. A drying temperature is usually in the range of about 5 to 150° C., preferably in the range of about 30 to 120° C. and a time of drying is usually 120 sec or more, and preferably 300 sec or more.

The adhesive is preferably controlled on temperature in a period from preparation till coating. Water resistance can be improved by controlling a temperature of an adhesive. A controlled temperature of an adhesive is preferably in the range of 30 to 50° C. A controlled temperature of an adhesive is more preferably in the range of 30 to 45° C. and further more preferably in the range of 30 to 40° C. A controlled temperature of an adhesive is preferably 30° C. or higher with respect to water resistance. If a controlled temperature exceeds 50° C., gelation easily occurs immediately after a crosslinking agent is mixed, which makes usage of an adhesive as such difficult. A temperature control of an adhesive is especially effective in a case of usage of an adhesive containing a crosslinking agent in the range of more than 30 parts by weight and 46 parts by weight or less relative to 100 parts by weight of polyvinyl alcohol-based resin containing an acetoacetyl group.

Note that as described above, in a case of usage of an adhesive containing a crosslinking agent in the range of more than 30 parts by weight and 46 parts by weight or less relative to 100 parts by weight of polyvinyl alcohol-based resin containing an acetoacetyl group, the adhesive is preferably prepared within 4 hr before coating of the adhesive. An operation from preparation of an adhesive till coating thereof in a short time within 4 hr can be accomplished by incorporating a step of preparing an adhesive into a series of steps of a manufacturing process for a polarizing plate as a part or by installing a proper preparation apparatus.

Then, in a manufacturing method of the invention, a transparent protective film and a polarizer are continuously adhered to each other with an adhesive layer interposed therebetween. An adhesive layer is formed on a surface of at least one of the transparent protective film and the polarizer in advance.

Figure 2:
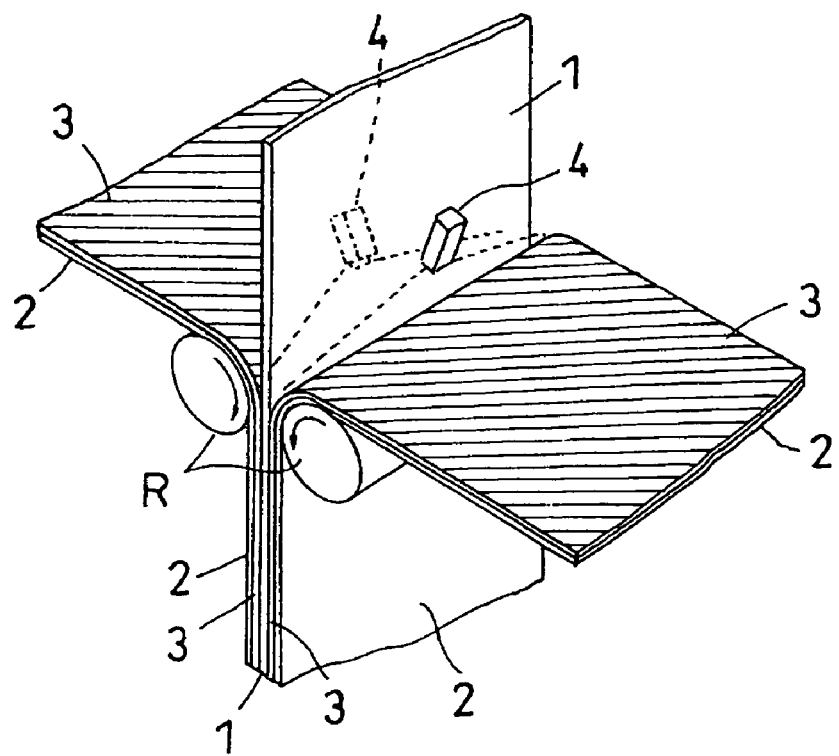
FIG. 2 is an example of a schematic view of a method for manufacturing a polarizing plate of the invention.
Figure 3:
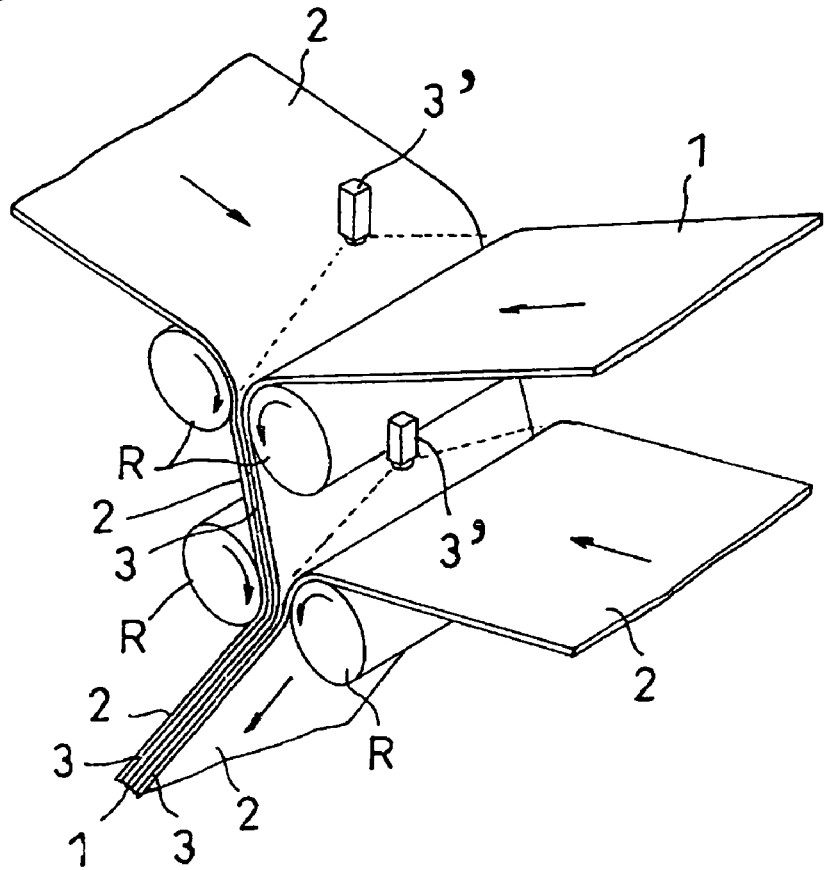
FIG. 3 is an example of a schematic view of a conventional method for manufacturing a polarizing plate.

No specific limitation is placed on an adhesion method. For example, a method can be used in which a transparent protective film and a polarizer are caused to continuously pass through between rolls in a pair with an adhesive layer interposed therebetween. Such a method is shown in FIGS. 1 to 2. FIG. 1 shows a case where a transparent protective film 2 on one surface of which an adhesive layer 3 is provided is caused to pass through between rolls R to thereby adhere to one surface of a polarizer 1 and thereafter, a transparent protective film 2 on which an adhesive layer 3 is provided is adhered to the other surface of the polarizer 1 in a similar way. On the other hand, FIG. 2 shows a case where transparent protective films 2 on each of which an adhesive layer 3 is provided are adhered to both surfaces of a polarizer 1 by causing the films to pass through between rolls R.

No specific limitation is place on a pair of rolls R as far as when a polarizer 1 and a transparent protective film 2 on which an adhesive layer 3 is formed are caused to pass through between the pair of rolls, the films can be adhered to each other under a roll pressure. For example, a pair of laminate nip rolls is used. A material of the rolls is not specifically limited and any roll of rubber and a metal may be used.

No specific limitation is placed on a transport velocity of a combination of a transparent protective film and a polarizer (an adhesive layer is formed on a surface of at least one thereof), but a transport velocity thereof is usually in the range of about 0.03 to 0.6 m/s, preferably in the range of about 0.08 to 0.5 m/s and more preferably in the range of about 0.11 to 0.34 m/s.

In a manufacturing method of the invention, an aqueous liquid is caused to be present on an adhering surface when a transparent protective film and a polarizer are adhered to each other with an adhesive layer interposed therebetween.

For example, water is used as an aqueous liquid. Pure water is preferable as the water. An aqueous solution containing a crosslinking agent dissolved therein is used as an aqueous liquid. A crosslinking agent to be used is one adapted for a kind of an adhesive. In a case of usage of a polyvinyl alcohol-based adhesive, a methylol compound is preferable as a crosslinking agent. No specific limitation is placed on a content of a crosslinking agent, but content thereof is usually 40 wt % or less, preferably in the range of 5 to 40 wt % and more preferably in the range of 10 to 35 wt %. Note that in a case where an aqueous solution containing a crosslinking agent is used as an aqueous liquid, an amount of a crosslinking agent is usually in the range of 2 to 40 wt % and preferably in the range of 4 to 35 wt % since a crosslinking agent is more effective in a less content than a case where the crosslinking agent is contained in an adhesive. In a case where an aqueous solution containing a crosslinking agent is used as an aqueous liquid, no necessity arises for adding a crosslinking agent into an adhesive solution, thereby enabling a pot life of the adhesive to be considerably longer. Such a construction is effective in a case where an adhesive described above is a polyvinyl alcohol-based resin containing an acetoacetyl group, which is a highly reactive functional group.

A viscosity of an aqueous liquid is usually in the range of 0.1 to 10 cP and preferably in the range of 0.5 to 5 cP. A viscosity of an aqueous liquid is a value measured by means of a method described in Example. If a viscosity thereof is less than 0.1 cP, a case arises where coating is difficult, while on the other hand, if a viscosity thereof exceeds 10 cP, appearance faults easily occur.

A supply quantity of an aqueous liquid is properly adjusted depending on a transport velocity or the like and is usually in the range of about 0.5 to 3.4 ml/s and preferably in the range of 0.5 to 1.7 ml/s. A supply quantity of an aqueous liquid can be properly adjusted so as to be adapted for the width of a raw material film.

No specific limitation is imposed on a supply method for an aqueous liquid as far as the aqueous liquid is present on an adhering surface of a transparent protective film and a polarizer when the transparent protective film and the polarizer are adhered to each other with an adhesive layer interposed therebetween. For example, an aqueous liquid can be supplied to an adhering surface of the transparent protective film and the polarizer. By supplying an aqueous liquid immediately before adhesion to an adhering surface just before adhesion, durability of the adhesive is raised and stripe-shaped appearance faults is more difficult in generation since the adhesive layer is not brought into contact with the aqueous liquid till just before adhesion, which is preferable.

By supplying an aqueous liquid to a transparent protective film or a polarizer (an adhesive layer is formed on at least one thereof) in transport, the aqueous liquid can be guided to an adhering surface thereof while being transported.

In the invention, it is preferable that an adhesive is coated only on the transparent protective film side and an aqueous liquid is supplied on the adhesive layer formed by the coating to thereby cause the aqueous liquid to be present on the adhering surfaces thereof. Especially, such a case is preferable where transparent protective films are adhered onto both surfaces of a polarizer in a state as shown in FIG. 2. This is because, in the example of FIG. 2, an unfavorable possibility occurs that the adhesive drip if an adhesive layer is provided on the polarizer side. It is preferable, because of the same reason, to supply an aqueous liquid on adhesive layers formed on transparent protective films.

In a case where an adhesive is coated only on the transparent protective film sides to form adhesive layers, an aqueous liquid can be supplied to the polarizer side. According to such a method, the adhesive layer is not brought into contact with the aqueous liquid by just before adhesion in a similar way to that as described above. If a moisture percentage in the inside or on the surface of a polarizer is smaller, this situation contributes to generation of stripe-shaped appearance faults. On the other hand, if a moisture percentage of the polarizer is raised, stripe-shaped appearance faults is difficult to be generated. If an aqueous liquid is supplied to the polarizer side, a moisture percentage of the polarizer is raised in a period till the polarizer is guided to adhesion rolls from a position of supply of the aqueous liquid, thereby enabling generation of stripe-shaped appearance faults to be effectively suppressed.

In a case where adhesive layers are formed by coating an adhesive only on the polarizer side, an aqueous liquid is preferably supplied to the transparent protective film sides. According to such a method, the adhesive layers are not brought into contact with the aqueous liquid by just before adhesion in a similar way to that as described above. Supply of an aqueous liquid to transparent protective films is advantageous in terms of a manufacturing apparatus since transparent protective films can be continuously adhered simultaneously on both surfaces of a polarizer without dripping of the adhesive.

In a case where transparent protective films and a polarizer are continuously adhered to each other with an adhesive layer interposed there between, an aqueous liquid is preferably supplied to adhering surfaces just before adhesion. The term "just before adhesion" means to adhere in a short time of 30 sec or less from supply of the aqueous liquid. The shorter the time is, the better a result is and a time to adhesion from the supply of an aqueous liquid is usually 5 sec or less, preferably 2 sec or less, more preferably 1 sec and further more preferably 0.5 sec or less. If a time to adhesion is excessive long, the adhesive is dissolved more than necessary in a case where the aqueous liquid is supplied on the adhesive layer, which easily causes an appearance irregularity. In a case where an aqueous liquid is supplied on transparent protective films or a polarizer, a moisture percentage is excessive large, therefore rendering appearance irregularity easily observed after drying. In a case where an aqueous liquid is supplied just before adhesion in such a way, a place on which the aqueous liquid is supplied may be either on the transparent protective film sides, or on one surface side or both sides of the polarizer. Alternatively, a method may also be used in which a liquid pool is provided in an adhesion section, and transparent protective films and/or a polarizer passes through the liquid pool just before adhesion.

In FIGS. 1 and 2, an aqueous liquid 4 is supplied to adhering surfaces between adhesive layers 3 provided to transparent protective film 2 and a polarizer 1. In FIGS. 1 and 2, an aqueous liquid has only to be present between rolls R in a pair and a site at which the aqueous liquid 4 is provided can be appropriately altered. In FIGS. 1 and 2, one supply site of the aqueous liquid 4 is provided to a pair of transported films (a combination of the polarizer and the transparent protective films), but plural supply sites of the aqueous liquid 4 can be provided. A supply site of an aqueous liquid 4 can also be provided to each pair of transported films. Methods for supplying an aqueous liquid include, for example, a dropping method, a coating method, a spray method and the like. A nozzle, a sprayer, a coater or the like can be selectively used in the supply methods.

In a case where an aqueous liquid is excessively present on adhering surfaces between transparent protective films and a polarizer and runs out from an edge portion of the adhering surfaces, the aqueous liquid in excess is removed with a suction nozzle or the like or gathered to a central portion of each of the adhering surfaces with an air nozzle or the like to thereby enable contamination due to running-out of the aqueous liquid to be prevented.

After the polarizer and the transparent protective films are adhered to each other with the adhesive layer interposed therebetween in the presence of the aqueous liquid with a roll laminator or the like as described above, the combination of the polarizer and the transparent protective are subjected to a drying step. A drying temperature is usually in the range of about 5 to 150° C. and preferably in the range of 30 to 120° C. for a time of 120 sec or more and preferably 300 sec or more.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective film etc.

As an example of a reflection type polarizing plate, a plate may be mentioned on which, if required, a reflective layer is formed using a method of attaching a foil and vapor deposition film of reflective metals, such as aluminum, to one side of a matte treated transparent protective film. Moreover, a different type of plate with a fine concavo-convex structure on the surface obtained by mixing fine particle into the above-mentioned transparent protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the transparent protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a transparent protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the transparent protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a transparent protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyarylates and polyamides; aligned films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxial stretched film as inclined alignment film etc. may be used. As inclined alignment film, for example, a film obtained using a method in which a heat shrinking film is adhered to a polymer film, and then the combined film is heated and stretched or shrunk under a condition of being influenced by a shrinking force, or a film that is aligned in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 wt % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Description will be given below of the construction and effect of the invention using examples and the like showing them in a concrete manner. Note that the terms "part or parts and %" means units based on weight unless otherwise stated.

(Viscosity Measuring Method for Aqueous Liquid)

A viscosity was measured at arate of shear of 82000 (1/s) at 23° C. using a viscosity measuring instrument (Rheometer Rheostress 1, manufactured by Thermo Haake Co.).

(Thickness Measuring Method for Adhesive Layer)

A thickness was measured by observation on a section with SEM.

(Preparation of Polarizer (A))

A polyvinyl alcohol (PVA) film with an average polymerization degree of 2400, a saponification degree of 99.9 mol % and a thickness of 80 μm was immersed into pure water at 25° C. for 60 sec to swell, while uniaxially stretched in a flow direction to a stretch magnification of 2 times. Then, the uniaxially stretched film was immersed in a 5% aqueous solution of iodine and potassium iodide at iodine/potassium iodide ratio of 1/10 in wt ratio, while stretched so that a total stretch magnification of 2.5 times and thereafter, the film is further stretched in an aqueous solution of boric acid at a concentration of 4 wt % and potassium iodide at a concentration of 3 wt % at 40° C. to a total stretch magnification of 3 times. Thereafter, the film was further stretched in an aqueous solution of potassium iodide at a concentration of 5 wt % at 25° C. to a total stretch magnification of 5.5 times, followed by washing in pure water. Then, the film was dried in an oven at 40° C. for 3 min to obtain a polarizer (A) with a thickness of 30 μm.

(Manufacture of Polarizer (B))

A polarizer (B) with a thickness of 19 μm was obtained in a similar way to that as described above with the exception that in the manufacture of a polarizer (A), a PVA film with an average polymerization degree of 2400, a saponification degree of 99.9 mol % and a thickness of 50 μm was used.

(Transparent Protective Film)

A triacetyl cellulose (TAC) film with a thickness of 40 μm was used.

Example 1

(Preparation of Adhesive)

Dissolved into pure water at a temperature of 30° C. were 100 parts of a PVA-based resin containing an acetoacetyl (AA) group (with an average polymerization degree of 1200, a saponification degree of 98.5 mol %, and an AA group modification degree of 5 mol %, which is shown as AA modified PVA in table 1) and 20 parts of methylol melamine to thereby prepare an aqueous solution at an adjusted solid matter concentration of 0.5%. The solution was used at a temperature of 30° C. as an adhesive.

(Manufacture of Polarizing Plate (a))

The adhesive was coated with die coater on one surface of the transparent protective film. The adhesive was coated 30 min after the preparation. Then, the wet coat was dried at 50° C. for 3 min to form an adhesive layer with a thickness of 31 nm after drying.

Then, TAC films each with the adhesive layer thereon were, as shown in FIG. 2, adhered to both surfaces of the polarizer (A) with a thickness of 30 μm with a roll machine while pure waters with a viscosity of 1 cP (at 23° C.) were supplied. A film transport velocity was 0.25 m/s and a supply rate of pure waters was 0.80 ml/s. Pure waters were supplied to sites on transparent protective films (at positions where it take 0.5 sec to reach the positions of adhesions on the films). Thereafter, the laminated film was dried for 6 min at 55° C. to thereby manufacture a polarizing plate.

Examples 2 to 4

Polarizing plates were obtained in a similar way to that in Example 1 with the exception that in the preparation of the adhesive of Example 1, concentrations of adhesives were varied as shown in Table 1. Thickness values of the adhesive layers are as shown in Table 1.

Examples 5 to 12

Polarizing plates were obtained in a similar way to that in Example 1 with the exception that in the preparation of the adhesive of Example 1, kinds of crosslinking agents used in adhesives and concentrations of the adhesives varied as shown in Table 1. Thickness values of the adhesive layers are as shown in Table 1.

Examples 13 to 16

Polarizing plates were obtained in a similar way to that in Example 1 with the exception that in the preparation of the adhesive of Example 1, resins used in adhesives were replaced with a polyvinyl alcohol-based resin (with an average polymerization degree of 1200 and a saponification degree of 98.5 mol %) and concentrations of the adhesives were varied as shown in Table 1. Thickness values of the adhesive layers are shown in Table 1.

Example 17

A polarizing plate was obtained in a similar way to that in Example 1 with the exception that in the preparation of the polarizing plate of Example 1, an aqueous solution containing methylol melamine at a concentration of 5 wt % with a viscosity of 3 cP (at 23° C.) was used instead of pure water. A thickness of an adhesive layer is shown in Table 1.

Examples 18 to 20

Polarizing plates were obtained in a similar way to that in Example 1 with the exception that in the preparation of the adhesive of Example 1, the crosslinking agent was not used in adhesives and in the preparation of the polarizing plate of Example 1, an aqueous solution shown in Table 1 was used instead of pure water. Thickness values of adhesive layers are shown in Table 1.

Example 21

A polarizing plate was obtained in a similar way to that in Example 3 with the exception that in Example 3, the crosslinking agent was not used in the adhesive. A thickness of adhesive layer is shown in Table 1.

Examples 22 to 24

Polarizing plates were obtained in a similar way to that in Example 3 with the exception that in Example 3, the crosslinking agent was not used in the adhesive and an aqueous solution shown in Table 1 was used instead of pure water. Thickness values of adhesive layers are shown in Table 1.

Example 25

A polarizing plate was obtained in a similar way to that in Example 3 with the exception that in Example 3, the crosslinking agent was not used in the adhesive. A thickness of adhesive layer is shown in Table 1.

Examples 26 to 28

Polarizing plates were obtained in a similar way to that in Example 3 with the exception that in Example 3, the crosslinking agent was not used in the adhesive and the aqueous solution shown in Table 1 were used instead of pure water. Thickness values of adhesive layers are shown in Table 1.

Example 29

A polarizing plate was obtained in a similar way to that in Example 3 with the exception that in Example 3, pure waters were supplied in drops on triacetyl cellulose films with the adhesive layer thereon at distances of 1 m from positions where the films and the polarizer were adhered to each other instead of the way that pure waters were supplied in drops on the films just before the adhesions (at positions where it takes 0.5 sec to reach the positions of adhesions on the films) and a transport velocity of the film was set to 0.25 m/s so that it takes 4 sec to reach the positions of the adhesions. A thickness of adhesive layer is shown in Table 1.

Example 30

A polarizing plate was obtained in a similar way to that in Example 3 with the exception that in Example 3, pure waters were supplied in drops on triacetyl cellulose films with the adhesive layer thereon at distances of 1 m from positions where the films and the polarizer were adhered to each other instead of the way that pure waters were supplied in drops on the films just before the adhesions (at positions where it takes 0.5 sec to reach the positions of adhesions on the films) and a transport velocity of the film was set to 0.1 m/s so that it takes 10 sec to reach the positions of the adhesions. A thickness of adhesive layer is shown in Table 1.

Example 31

A polarizing plate was obtained in a similar way to that in Example 3 with the exception that in Example 3, pure waters were supplied in drops on triacetyl cellulose films with the adhesive layer thereon at distances of 1 m from positions where the films and the polarizer were adhered to each other instead of the way that pure waters were supplied in drops on the films just before the adhesions (at a position where it takes 0.5 sec to reach the positions of adhesions on the films) and a transport velocity of the film was set to 0.04 m/s so that it takes the film 25 sec to reach the positions of adhesions. A thickness of adhesive layer is shown in Table 1.

Example 32

A polarizing plate was obtained in a similar way to that in Example 3 with the exception that in Example 3, the polarizer (B) was used instead of the polarizer (A). A thickness of adhesive layer is shown in Table 1.

Comparative Example 1

A polarizing plate was prepared in a similar way to that in Example 1 with the exception that a way of manufacture of polarizing plate (b) described below was employed instead of the way of manufacture of polarizing plate (a) in Example 1.

(Manufacture of Polarizing Plate (b))

Figure 4:
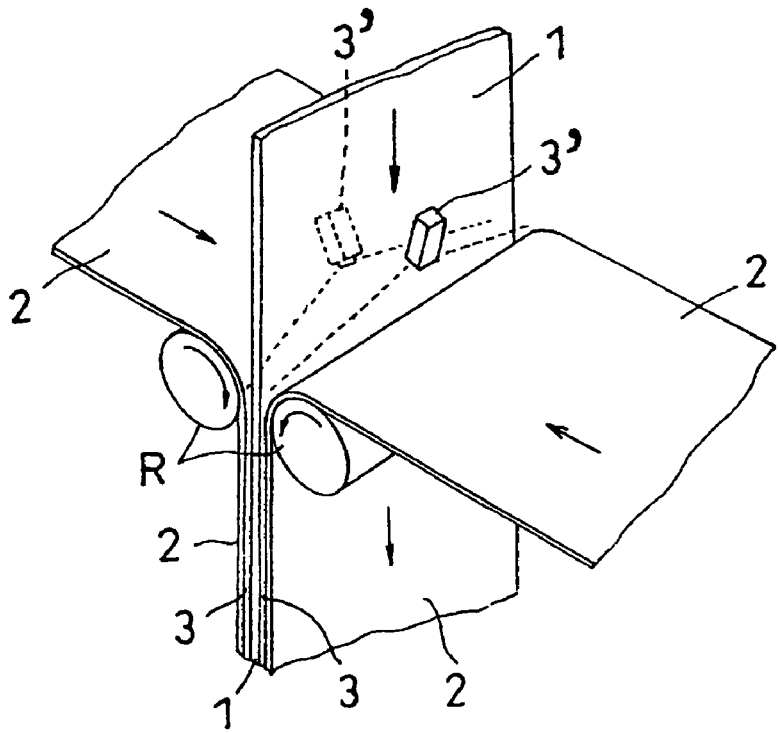
FIG. 4 is an example of a schematic view of a conventional method for manufacturing a polarizing plate.

Transparent protective films were, as shown in FIG. 4, adhered onto both surfaces of a polarizer (A) with a roll machine while the adhesive was supplied, and thereafter, the laminate film was dried at 55° C. for 6 min to thereby manufacture a polarizing plate. A transport velocity of the transparent protective films was set to 0.35 m/s and a supply quantity of the adhesive was set to 0.60 ml/s. Supply sites were on transparent protective films (at positions where it takes 0.5 sec to reach the positions of adhesions on the films) to thereby form adhesive layers with a thickness of 16 mm after drying on the films.

Comparative Examples 2 to 20

Polarizing plates were obtained in a similar way to that in Comparative Example 1 with the exception that kinds of polyvinyl alcohol-based resins used in adhesives, kinds of crosslinking agents and concentrations of adhesives were varied as shown in Table 1. Thickness values of the adhesives are shown in Table 1. Note that in Comparative Examples 17 to 20, a polyvinyl alcohol-based resin (with an average polymerization degree of 1200 and a saponification degree of 98.5 mol %) was used.

Comparative Example 21

A polarizing plate was obtained in a similar way to that in Comparative Example 3 with the exception that the polarizer (B) was used instead of the polarizer (A). A thickness of adhesive layer is shown in Table 1.

(Evaluation)

The polarizing plates obtained in Examples and Comparative Examples were cut into polarizing plate samples so that a size of each polarizing plate sample is 50 mm in the direction of the absorption axis of the polarizer and 25 mm in a direction perpendicular to the absorption axis. Evaluation was conducted on the samples with the following criteria. The results are shown in Table 1.

(Appearance Fault Evaluation)

Light from a fluorescent lamp was reflected on the obtained polarizing plate sample to visually evaluate a reflection image with the following criteria:

○: any of stripe-shaped or dotted faults and other irregularities is not observed.

▲: stripe-shaped or dotted faults and other irregularities are observed in a local area.

x: stripe-shaped or dotted faults and other irregularities are observed all over the surface.

(Light Leakage Evaluation)

The obtained two polarizing plate samples were superimposed in the cross-Nichols relation so that the absorption axes are perpendicular to each other and in this state, light leakage of the superimposed samples using light from a fluorescent lamp was visually evaluated with the following criteria:

○: without light leakage x: with light leakage (Durability)

The obtained polarizing plate samples were immersed in warm water at 60° C. for 3 hr and thereafter, a peel length (mm) at an edge of a sample was measured and evaluated with the following criteria. Measurement of a peel length (mm) was made using a caliper or a square.

○○: without a peel

○: with a peel less than 3 mm

▲: with a peel in the range of 3 to 30 mm x: with a peel of 31 mm or longer

TABLE 1

| | Adhesives | | | | Aqueous liquids | | Evaluation | | |
|---|---|---|---|---|---|---|---|---|---|
| | Kinds of resins | Kinds of cross-linking agents | Concentrations in solutions (%) | Thicknesses of dry adhesive layers (nm) | Kinds | Concentrations (%) | Viscosities (cP) | Appearance faults | Light leakage | Durability |
| Example 1 | AA modified PVA | Methylol melamine | 0.50 | 31 | Pure water | — | 1 | ○ | ○ | ○ |
| Example 2 | AA modified PVA | Methylol melamine | 0.75 | 67 | Pure water | — | 1 | ○ | ○ | ○ |

TABLE 1-continued

| | Adhesives | | | | Aqueous liquids | | Evaluation | | |
|---|---|---|---|---|---|---|---|---|---|
| | Kinds of resins | Kinds of cross-linking agents | Concentrations in solutions (%) | Thicknesses of dry adhesive layers (nm) | Kinds | Concentrations (%) | Viscosities (cP) | Appearance faults | Light leakage | Durability |
| Example 3 | AA modified PVA | Methylol melamine | 1.00 | 124 | Pure water | — | 1 | ○ | ○ | ○○ |
| Example 4 | AA modified PVA | Methylol melamine | 2.00 | 212 | Pure water | — | 1 | ○ | ○ | ○○ |
| Example 5 | AA modified PVA | Glyoxal | 0.50 | 34 | Pure water | — | 1 | ○ | ○ | ▲ |
| Example 6 | AA modified PVA | Glyoxal | 0.75 | 64 | Pure water | — | 1 | ○ | ○ | ▲ |
| Example 7 | AA modified PVA | Glyoxal | 1.00 | 118 | Pure water | — | 1 | ○ | ○ | ▲ |
| Example 8 | AA modified PVA | Glyoxal | 2.00 | 209 | Pure water | — | 1 | ○ | ○ | ▲ |
| Example 9 | AA modified PVA | Glutaraldehyde | 0.50 | 32 | Pure water | — | 1 | ○ | ○ | ▲ |
| Example 10 | AA modified PVA | Glutaraldehyde | 0.75 | 65 | Pure water | — | 1 | ○ | ○ | ▲ |
| Example 11 | AA modified PVA | Glutaraldehyde | 1.00 | 122 | Pure water | — | 1 | ○ | ○ | ▲ |
| Example 12 | AA modified PVA | Glutaraldehyde | 2.00 | 205 | Pure water | — | 1 | ○ | ○ | ▲ |
| Example 13 | PVA | Methylol melamine | 0.50 | 30 | Pure water | — | 1 | ▲ | ○ | ▲ |
| Example 14 | PVA | Methylol melamine | 0.75 | 63 | Pure water | — | 1 | ▲ | ○ | ▲ |
| Example 15 | PVA | Methylol melamine | 1.00 | 127 | Pure water | — | 1 | ▲ | ○ | ▲ |
| Example 16 | PVA | Methylol melamine | 2.00 | 211 | Pure water | — | 1 | ▲ | ○ | ▲ |
| Example 17 | AA modified PVA | Methylol melamine | 0.50 | 31 | Aqueous solution | Methylol melamine (5%) | 3 | ○ | ○ | ○ |
| Example 18 | AA modified PVA | None | 0.50 | 31 | Aqueous solution | Methylol melamine (5%) | 3 | ○ | ○ | ○○ |
| Example 19 | AA modified PVA | None | 1.00 | 125 | Aqueous solution | Methylol melamine (5%) | 3 | ○ | ○ | ○○ |
| Example 20 | AA modified PVA | None | 1.00 | 150 | Aqueous solution | Methylol melamine (10%) | 4 | ○ | ○ | ○○ |
| Example 21 | AA modified PVA | None | 1.00 | 127 | Pure water | — | 1 | ○ | ○ | ▲ |
| Example 22 | AA modified PVA | None | 1.00 | 127 | Aqueous solution | Methylol melamine (5%) | 4 | ○ | ○ | ○ |
| Example 23 | AA modified PVA | None | 1.00 | 128 | Aqueous solution | Methylol melamine (10%) | 5 | ○ | ○ | ○ |
| Example 24 | AA modified PVA | None | 1.00 | 127 | Aqueous solution | Methylol melamine (20%) | 6 | ○ | ○ | ○ |
| Example 25 | AA modified PVA | Methylol melamine | 1.00 | 119 | Pure water | — | 1 | ○ | ○ | ○ |
| Example 26 | AA modified PVA | Methylol melamine | 1.00 | 119 | Aqueous solution | Methylol melamine (5%) | 4 | ○ | ○ | ○ |
| Example 27 | AA modified PVA | Methylol melamine | 1.00 | 120 | Aqueous solution | Methylol melamine (10%) | 5 | ○ | ○ | ○ |
| Example 28 | AA modified PVA | Methylol melamine | 1.00 | 120 | Aqueous solution | Methylol melamine (20%) | 6 | ○ | ○ | ○ |
| Example 29 | AA modified PVA | Methylol melamine | 1.00 | 122 | Pure water | — | 1 | ○ | ○ | ○ |
| Example 30 | AA modified PVA | Methylol melamine | 1.00 | 124 | Pure water | — | 1 | ○ | ○ | ▲ |
| Example 31 | AA modified PVA | Methylol melamine | 1.00 | 120 | Pure water | — | 1 | ○ | ○ | ▲ |
| Example 32 | AA modified PVA | Methylol melamine | 1.00 | 118 | Pure water | — | 1 | ○ | ○ | ○○ |

TABLE 1-continued

| | Adhesives | | | Thicknesses of | Aqueous liquids | | | Evaluation | | |
|---|---|---|---|---|---|---|---|---|---|---|
| | Kinds of resins | Kinds of cross-linking agents | Concentrations in solutions (%) | dry adhesive layers (nm) | Kinds | Concentrations (%) | Viscosities (cP) | Appearance faults | Light leakage | Durability |
| Comparative Example 1 | AA modified PVA | Methylol melamine | 0.50 | 16 | None | — | — | x | ○ | x |
| Comparative Example 2 | AA modified PVA | Methylol melamine | 0.75 | 20 | None | — | — | x | ○ | x |
| Comparative Example 3 | AA modified PVA | Methylol melamine | 1.00 | 23 | None | — | — | x | ○ | x |
| Comparative Example 4 | AA modified PVA | Methylol melamine | 2.00 | 27 | None | — | — | x | ○ | ▲ |
| Comparative Example 5 | AA modified PVA | Methylol melamine | 2.50 | 32 | None | — | — | x | ○ | ○ |
| Comparative Example 6 | AA modified PVA | Methylol melamine | 3.00 | 52 | None | — | — | x | ○ | ○ |
| Comparative Example 7 | AA modified PVA | Methylol melamine | 3.50 | 83 | None | — | — | x | ○ | ○ |
| Comparative Example 8 | AA modified PVA | Methylol melamine | 4.00 | 203 | None | — | — | x | ○ | ○○ |
| Comparative Example 9 | AA modified PVA | Glyoxal | 2.50 | 34 | None | — | — | x | ○ | x |
| Comparative Example 10 | AA modified PVA | Glyoxal | 3.00 | 52 | None | — | — | x | ○ | x |
| Comparative Example 11 | AA modified PVA | Glyoxal | 3.50 | 84 | None | — | — | x | ○ | x |
| Comparative Example 12 | AA modified PVA | Glyoxal | 4.00 | 195 | None | — | — | x | ○ | x |
| Comparative Example 13 | AA modified PVA | Glutar-aldehyde | 2.50 | 32 | None | — | — | x | ○ | x |
| Comparative Example 14 | AA modified PVA | Glutar-aldehyde | 3.00 | 54 | None | — | — | x | ○ | x |
| Comparative Example 15 | AA modified PVA | Glutar-aldehyde | 3.50 | 87 | None | — | — | x | ○ | x |
| Comparative Example 16 | AA modified PVA | Glutar-aldehyde | 4.00 | 205 | None | — | — | x | ○ | x |
| Comparative Example 17 | PVA | Methylol melamine | 2.50 | 33 | None | — | — | x | ○ | x |
| Comparative Example 18 | PVA | Methylol melamine | 3.00 | 51 | None | — | — | x | ○ | x |
| Comparative Example 19 | PVA | Methylol melamine | 3.50 | 86 | None | — | — | x | ○ | x |
| Comparative Example 20 | PVA | Methylol melamine | 4.00 | 203 | None | — | — | x | ○ | x |
| Comparative Example 21 | AA modified PVA | Methylol melamine | 1.00 | 21 | None | — | — | x | x | x |

In Table 1, PVA means polyvinyl alcohol, and AA modified PVA means a polyvinyl alcohol-based resin containing an acetoacetyl group.

A polarizing plate obtained by means of a manufacturing method of the invention is preferably employed alone as it is or as an optical film manufactured by laminating the polarizing plates in a liquid crystal display, a flat panel display such as an electroluminescence display or an image viewing display such as a plasma display panel (PDP).

The invention claimed is:

1. A method for manufacturing a polarizing plate in which a transparent protective film provided on at least one surface of a polarizer with an adhesive layer interposed therebetween, comprising:

in the following order,
coating an aqueous liquid containing a polyvinyl alcohol based adhesive on a surface of the transparent protective film to form the adhesive layer, and, after forming the adhesive layer, then,
adhering the transparent protective film and the polarizer continuously to each other with the adhesive layer interposed therebetween, while presenting an aqueous liquid, which consists of water, on an adhering surface between the adhesive layer and the polarizer, or in the following order,
coating an aqueous liquid containing a polyvinyl alcohol based adhesive on a surface of the polarizer, to form the adhesive layer, and, after forming the adhesive layer, then,
adhering the transparent protective film and the polarizer continuously to each other with the adhesive layer interposed therebetween, while presenting an aqueous liquid, which consists of water, on an adhering surface between the adhesive layer and the transparent protective film, or in the following order,
coating an aqueous liquid containing a polyvinyl alcohol based adhesive on a surface of the polarizer and coating an aqueous liquid containing an adhesive on a surface of the transparent protective film, to form the adhesive layer, wherein the adhesive layer comprises the adhesive on a surface of the polarizer and the adhesive on a surface of the transparent protective film, and, after forming the adhesive layer, then, adhering the transparent protective film and the polarizer continuously to each other with the adhesive layer interposed therebetween, while presenting an aqueous liquid, which consists of water, on an adhering surface between the adhesive layer on the polarizer and the adhesive layer on the transparent protective film, wherein a thickness of the adhesive layer is in the range of 30 to 300 nm.

2. The method for manufacturing the polarizing plate according to claim 1, wherein the polarizer is a polyvinyl alcohol-based polarizer and the transparent protective film is a cellulose-based transparent protective film.

3. The method for manufacturing the polarizing plate according to claim 1, wherein a thickness of the polarizer is 35 μm or less.

4. The method for manufacturing the polarizing plate according to claim 1, wherein the polyvinyl alcohol-based adhesive is a polyvinyl alcohol-based adhesive having an acetoacetyl group.

5. The method for manufacturing the polarizing plate according to claim 1, wherein the adhesive comprises a crosslinking agent.

6. The method for manufacturing the polarizing plate according to claim 5, wherein the crosslinking agent is a methylol compound.

7. The method for manufacturing the polarizing plate according to claim 1, wherein a viscosity of the aqueous liquid which consists of water is in the range of 0.1 to 10 cP.

8. The method for manufacturing the polarizing plate, in which a transparent protective film provided on at least one surface of a polarizer with an adhesive layer interposed therebetween, comprising:

in the following order, coating an aqueous liquid containing a polyvinyl alcohol based adhesive on a surface of the transparent protective film to form the adhesive layer and/or coating an aqueous liquid containing a polyvinyl alcohol based adhesive on a surface of the polarizer, to form the adhesive layer, and, after forming the adhesive layer, then, adhering the transparent protective film and the polarizer continuously to each other with the adhesive layer interposed therebetween, while presenting an aqueous liquid consisting of water and a crosslinking agent dissolved therein on an adhering surface between the transparent protective film and the polarizer, wherein a thickness of the adhesive layer is in the range of 30 to 300 nm.

9. The method for manufacturing the polarizing plate according to claim 8, wherein the crosslinking agent is a methylol compound.

10. The method for manufacturing the polarizing plate according to claim 1, wherein the aqueous liquid which consists of water is supplied on an adhering surface between the transparent protective film and the polarizer.

11. The method for manufacturing the polarizing plate according to claim 1, wherein the adhesive is coated only onto the transparent protective film side and the aqueous liquid which consists of water is supplied on the adhesive layer formed by the coating to thereby cause the aqueous liquid which consists of water to be present on the adhering surface.

12. The method for manufacturing the polarizing plate according to claim 1, wherein the adhesive is coated only onto the transparent protective film side, while the aqueous liquid which consists of water is supplied onto the polarizer side to thereby cause the aqueous liquid which consists of water to be present on the adhering surface.

13. The method for manufacturing the polarizing plate according to claim 1, wherein the adhesive is coated only onto the polarizer side, while the aqueous liquid which consists of water is supplied onto the transparent protective film side to thereby cause the aqueous liquid which consists of water to be present on the adhering surface.

14. The method for manufacturing the polarizing plate according to claim 1, wherein the aqueous liquid which consists of water is supplied onto an adhering surface just before adhesion when the transparent protective film and the polarizer are continuously adhered to each other with the adhesive layer interposed therebetween.

15. A polarizing plate obtained by the method according to claim 1.

16. An optical film comprising at least one polarizing plate according to claim 15.

17. An image viewing display comprising the polarizing plate according to claim 15.

18. The method for manufacturing the polarizing plate according to claim 1, wherein a transport velocity of a combination of the transparent protective film and the polarizer, in which the adhesive layer is formed on at least one of the surface of the transparent protective film or the surface of the polarizer thereof, and said transport velocity is in the range of about 0.03 to 0.6 m/s.

19. The method for manufacturing the polarizing plate according to claim 1, wherein a supply quantity of the aqueous liquid which consists of water is in the range of about 0.5 to 3.4 ml/s.

20. The method for manufacturing the polarizing plate according to claim 1, wherein the aqueous liquid which consists of water is presented to adhering surfaces in a time of 30 sec or less from supply of the aqueous liquid.

21. The method for manufacturing the polarizing plate according to claim 1, wherein a concentration of the adhesive in the aqueous liquid containing an adhesive is in the range of 0.1 to 15 wt %.

22. The method for manufacturing the polarizing plate according to claim 1, wherein a concentration of the adhesive in the aqueous liquid containing an adhesive is in the range of 0.5 to 10 wt %.

23. The method for manufacturing the polarizing plate according to claim 1, wherein a concentration of the adhesive in the aqueous liquid containing an adhesive is in the range of 0.5 to 2 wt %.

* * * * *